United States Patent [19]
McNaughton et al.

[11] Patent Number: 5,257,833
[45] Date of Patent: Nov. 2, 1993

[54] METAL RETAINER FOR QUICK CONNECT TUBING CONNECTOR

[75] Inventors: James McNaughton, Rochester; Donald C. Walker, Pontiac, both of Mich.

[73] Assignee: Bundy Corporation, Mt. Clemens, Mich.

[21] Appl. No.: 766,619

[22] Filed: Sep. 25, 1991

[51] Int. Cl.⁵ .............................................. F16L 37/12
[52] U.S. Cl. ..................................... 285/319; 285/921
[58] Field of Search ................... 285/308, 319, 921, 4, 285/27

[56] References Cited

U.S. PATENT DOCUMENTS

| | | |
|---|---|---|
| 4,541,658 | 9/1985 | Bartholomew . |
| 4,681,351 | 7/1987 | Bartholomew . |
| 4,756,558 | 7/1988 | Beamer .................. 285/319 |
| 4,778,203 | 10/1988 | Bartholomew . |
| 4,846,506 | 7/1989 | Bocson et al. ............ 285/319 |
| 4,927,185 | 5/1990 | McNaughton ............ 285/319 |
| 4,979,765 | 12/1990 | Bartholomew . |
| 5,002,315 | 3/1991 | Bartholomew . |
| 5,009,454 | 4/1991 | Bartholomew . |
| 5,039,139 | 8/1991 | McElroy et al. .......... 285/319 |
| 5,100,182 | 3/1992 | Norkey et al. ............ 285/319 |
| 5,139,228 | 8/1992 | Norkey .................... 285/921 |
| 5,161,834 | 11/1992 | Norkey .................... 285/319 |

FOREIGN PATENT DOCUMENTS 9111651 8/1991 World Int. Prop. O. .......... 285/319

Primary Examiner—Eric K. Nicholson
Attorney, Agent, or Firm—Kinzer, Plyer, Dorn, McEachran & Jambor

[57] ABSTRACT

A unique retainer is disclosed having a plurality of resilient arms securing a tube within a housing bore. The arms include a radially inner section having a pair of circumferentially extending braces which increase the strength of the arms. The braces have axial ends which are bent radially outwardly and increase the strength of the arms, and also result in a more consistent, predictable buckling force for the retainer. Arm bends are formed between the arm radially inner section and a radially outer section. The axially outer bends of the braces are generally axially aligned with these arm bends, such that the bends provide a planer surface for positioning the retainer within the housing. Also, "bumps" are defined at a radially inner face of the radially inner sections of the arms to create a high force resisting tube insertion. The bumps are at an angle relative to a central axis that is greater than the angle of the remainder of the radially inner section of the arms. Thus, the retainer arms may extend at a first angle which is relatively small relative to the axis and can provide a great force resisting tube removal, while the bumps are at the greater angle, and can provide a relatively great force resisting tube insertion.

44 Claims, 2 Drawing Sheets

METAL RETAINER FOR QUICK CONNECT TUBING CONNECTOR

BACKGROUND OF THE INVENTION

This invention relates generally to improvements in metal retainers for retaining tubing within a housing.

Metal retainers having arms which flex radially to allow a radially enlarged, or upset of a tube to pass through the arms are known. The arms flex radially inwardly once the upset portion of the tube passes them, and abut the upset portion, preventing tube removal. This general type of retainer is widely utilized.

It is a goal in the art that the retainer easily and quickly receive a tube, while at the same time preventing the tube from being pulled outwardly of the housing. The retainer will retain the tube in the housing until the retainer "buckles". The force required to buckle the retainer is defined herein as a "buckling force." It is desirable that the buckling force be relatively high, and constant and predictable.

It is known in the prior art to extend brace members circumferentially from the arms to provide additional strength resisting buckling, and further to provide a surface which properly positions the retainer. The prior art braces may reduce the consistency of the buckling force for the metal retainer. This is undesirable, since a consistent buckling force is sought, such that the buckling force for a particular system may be accurately predicted.

Some prior art retainers provide an insertion force resisting tube insertion which increases sharply from a relatively low force to a relatively high force. Once this high force is overcome, and the tube moves past a particular point on the retainer, the momentum of the tube carries it to a fully connected position. This is referred to as an "avalanche" type connector. This type of connector ensures that a tube is properly connected within a housing, since the operator knows the relatively high force must be encountered and overcome for the tube to be properly positioned. Once the high force is encountered and overcome, tube momentum ensures that the tube is fully positioned within the housing. Known avalanche systems are quite successful, however, it is still desired to improve upon the known systems.

SUMMARY OF THE INVENTION

A disclosed embodiment of this invention includes a metal retainer having a plurality of arms each having a radially outer section, and a radially inner section. The radially inner section abuts a radially enlarged, or upset portion of a tube. The retainer is received in a housing bore, and retains the tube in the bore. An axis is defined extending into the bore. The radially inner section preferably has circumferentially extending braces extending from each circumferential side. In one preferred embodiment the braces have axially inner ends which are bent radially outwardly from planar radially inwardly facing faces of the braces, and axially outer ends which are also bent radially outwardly from the inner faces of the braces. The bends at the axial ends of the braces increase the buckling strength of the retainer, and further ensure that the buckling force is relatively consistent, and thus predictable.

The arm radially inner section also has an axially inner end that is bent radially outwardly. The bent axially inner ends of the arm and the braces protect the tube against damage, and also provide a relatively large contact area between the retainer and tube upset portion. The bent brace outer ends, in combination with a bend on the arm between the radially outer and inner portions, are generally co-planar, and locate the retainer within a housing bore.

In another feature of the present invention, a radially inwardly facing face of the radially inner section includes a bump which provides the avalanche point, or the relatively high force resisting tube insertion. As the upset portion of the tube contacts this bump, the force required for further tube insertion increases sharply. Once this force is overcome, momentum carries the tube to a fully inserted position. In one preferred embodiment, the bump is ramped with an axially outwardly facing surface extending radially and axially inwardly to a relatively flat surface. The bump is ramped back radially outwardly axially beyond the flat surface. The bump allows the radially inner section to be on a first relatively small angle with respect to a bore axis, such that the arm has additional strength. At the same time, the ramped surfaces are at a relatively great angle to provide the sharply increased force against tube insertion to give an operator the avalanche signal.

These and other objects and features of the present invention are best understood from the following specifications and drawings of which the following is a brief description.

DETAILED DESCRIPTION OF A PREFERRED EMBODIMENT

Figure 1:
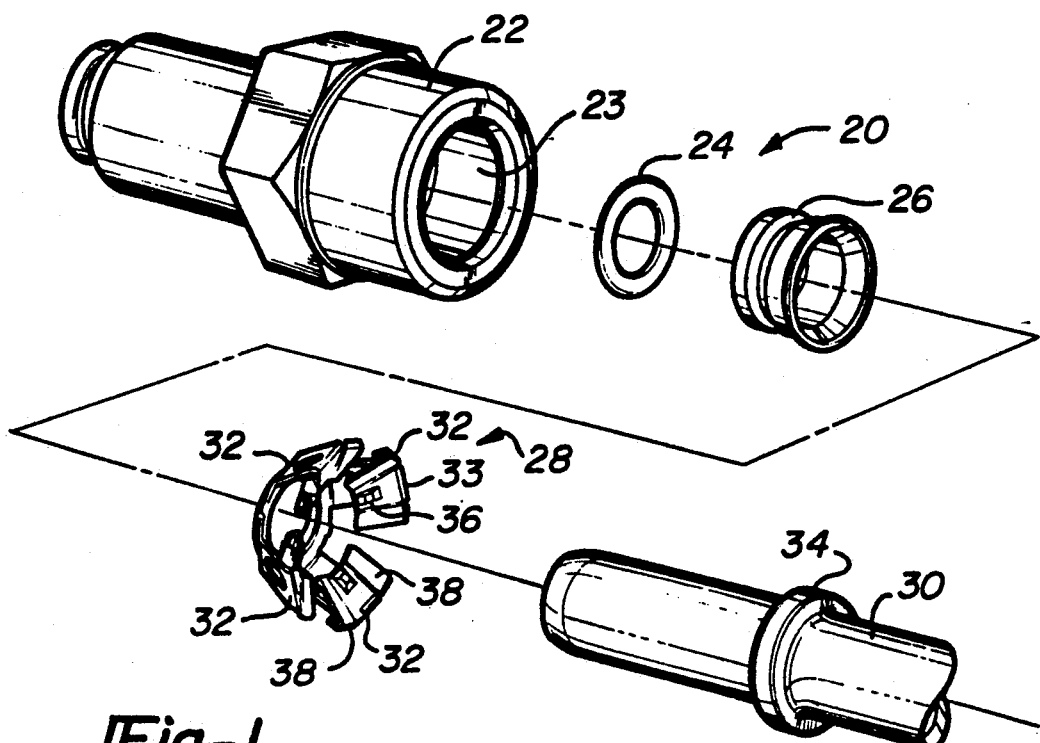
FIG. 1 is an assembly view of a connector according to the present invention.

FIG. 1 is an exploded view of a connector 20 including conduit or housing 22 defining a bore 23. An axis is defined extending into bore 23. An O-ring 24 and a spacer 26 are inserted axially into the bore. A retainer 28 is inserted into bore 23, and secures a tube 30 within bore 23. Retainer 28 includes a plurality of circumferentially spaced arms 32 which abut a radially greater, or upset portion 34 of tube 30 to retain tube 30 in bore 23.

Each arm 32 includes a radially inner section 33 which abuts upset portion 34. A bump 36 formed from a radially inner face of radially inner section 33 provides a relatively great force resisting tube insertion, as will be explained below. Braces 38 extend circumferentially from each circumferential side of radially inner sections 33, and provide additional strength against buckling of retainer 28.

Figure 2:
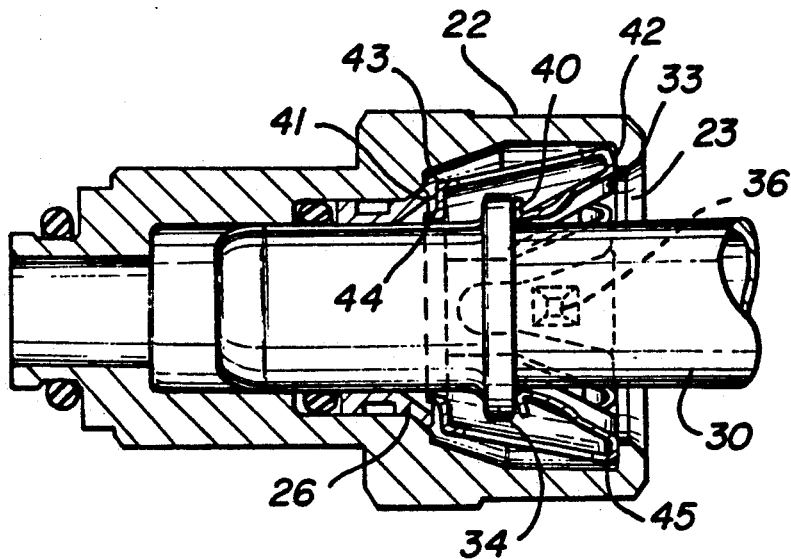
FIG. 2 is a cross-sectional view through the assembled connector.

As shown in FIG. 2, radially inner section 33 includes a lip 40 which abuts upset portion 34. Lip 40 is bent radially outwardly such that it contacts upset portion 34 over a relatively great surface area. A rear bend 42 connects radially inner section 33 with a radially outer section 43. A cylindrical forward ring 44 extends axially from a ring 41 which connects the plurality of circumferentially spaced arms 32. Ring 44 provides guidance for tube 30 in bore 23, and extends into a frustoconical bore in spacer 26. As shown, rear bend 42 abuts an inner face 45 of housing 22 to position retainer 28 in bore 23.

When assembling connector 20, retainer 28 is initially placed in housing 22. Tube 30 is inserted until a forward end of upset portion 34 abuts bumps 36. Until that point, the force resisting tube insertion is relatively low. For further tube insertion, upset portion 34 must flex the radially inner sections 33 radially outwardly such that upset portion 34 may move axially beyond bumps 36. This sharply increases the force resisting tube insertion. Once the increased force is overcome, momentum carries the tube to a fully inserted position as shown in FIG. 2.

Figure 3:
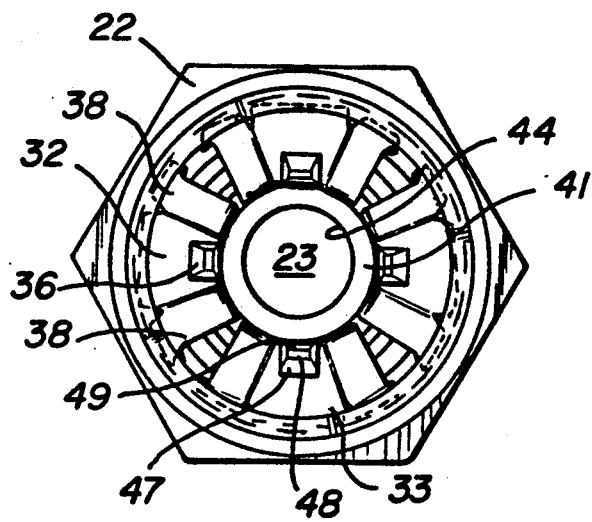
FIG. 3 is an end view of the connector prior to tube insertion.

As shown in FIG. 3, when retainer 28 is received within conduit 22, arms 32 are spaced circumferentially about bore 23. Braces 38 extend circumferentially from radially inner sections 33. Each bump 36 consists of an axially outer ramped portion 47 extending radially outwardly and axially inwardly from the radially inner surface of radially inner section 33. A flat or planar portion 48 merges with outer ramped portion 47, and is generally parallel to the remainder of radially inner section 33. An inner ramped portion 49 extends from planar portion 48 back to the radially inner surface of radially inner section 33. Outer ramped portion 47 applies the sharply increased force. Once upset portion 34 has moved beyond outer ramped portion 47, the momentum of the tube will carry it along planar portion 48, and along inner ramped portion 49 such that tube 30 is fully inserted within conduit 22.

Since bump 36 provides the avalanche force, the radially inner section 33 which secures tube 30 within bore 23 may be at an angle which is relatively small compared to the axis of the tube. Bump 36 provides the sharply increased force, while still allowing radially inner section 33 to be at a relatively small angle, where it can provide a strong force against tube removal.

Figure 4:
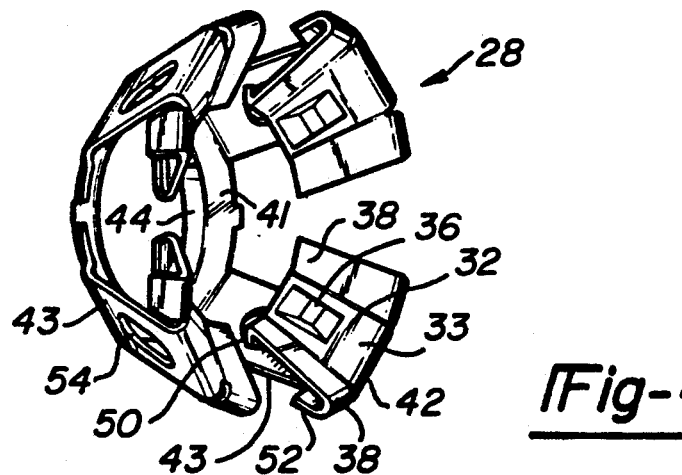
FIG. 4 is a perspective view of the inventive retainer.

As shown in FIG. 4, radially inner sections 33 extend for a greater circumferential extent than bumps 36. Braces 38 extend circumferentially and radially inwardly from each circumferential side of radially inner sections 33. Each brace 38 has an inner bend 50 bent radially outwardly and back over brace 38. Inner bends 50 are separate from forward lips 40. An outer bend 52 is bent radially outwardly and back over brace 38. The included angle between the bends 50 and 52 and braces 48 is acute. Bends 52 and 42 all lie in a single plane, and that plane is used to properly position retainer 28.

Braces 38 are generally parallelogram-like in shape. Bends 50 increase the contact area between retainer 28 and tube upset portion 34 at the axially inner end. It has been found that the bends at the axial ends of the braces not only increase the force necessary to cause buckling of retainer 28, but further ensure that the buckling force is consistent and predictable. Radially outer section 43 may have openings 54 to decrease the amount of material and further concentrate the strength of retainer 28 at the radially inner section 33.

Preferably, retainer 28 is stamped from a metal, and more preferably from a stainless steel. Planar portion 48 preferably extends over a greater axial length than either of the ramped portions 47 and 49. In one embodiment planar portion 48 extended for 1.5 centimeters while the two ramp portions each extended for 0.3 centimeters. In one embodiment the ramped portions extended at a 15° angle from the inner face of radially inner section 33. In an embodiment the angle between bend 50 and brace 38 was 45°, and the angle between bend 52 and brace 3 was 0°-5°.

A preferred embodiment of the present invention has been disclosed, however, a worker of ordinary skill in the art would recognize that certain modifications would come within the scope of this invention. For that reason, the following claims should be studied in order to determine the true scope and content of this invention.

We claim:

1. A retainer for retaining a tube within a bore comprising:
a body centered on an axis, and having a plurality of resilient arms, each said arm having a radially outer section and a radially inner section, said radially inner sections extending for a first circumferential distance, and a brace extending circumferentially from both circumferential extents of said radially inner sections, said braces extending axially between first and second axial ends, and said first and second axial ends of said braces being bent radially outwardly of said braces.

2. A retainer as recited in claim 1, wherein said first and second axial ends define an acute included angle with said braces.

3. A retainer as recited in claim 1, wherein said braces extend circumferentially away from said circumferential extents of said radially inner sections for discrete amounts at both said first and second ends, such that said braces are parallelogram-like in shape.

4. A quick connect tubing connector comprising:
a tube extending along an axis, and having a first outer diameter over the majority of an axial length, and having at least one upset portion of a greater outer diameter at one axial location;
a body defining a bore to receive said tube, said bore extending from an outer end axially inwardly; and
a retainer positioned within said bore to retain said tube within said bore, said retainer having a plurality of resilient arms extending axially and radially inwardly from an axially outer end of said bore, said resilient arms having a greatest inner diameter greater than the outer diameter of said upset portion, and a smallest inner diameter smaller than the outer diameter of said upset portion, said resilient arms having a radially inwardly facing surface extending for a first circumferential extent, and braces extending circumferentially from said radially inner surface of said arms, said braces extending axially between a brace axially inner end and a brace axially outer end, and bends extending radially outwardly from said braces at both said brace axially inner end and brace axially outer ends.

5. A connector as recited in claim 4, wherein said braces extend radially inwardly in a direction moving circumferentially from said arms.

6. A connector as recited in claim 4, wherein a radially inner section of said arms extends to a forward lip which contacts said upset portion, said forward lip being bent radially outwardly.

7. A connector as recited in claim 4, wherein each said arm has a radially inner section connected to a radially outer section at an arm bend adjacent said outer end of said bore, said bends at said axially outer end of said braces and said arm bends being generally axially aligned, such that they are generally located in a single plane perpendicular to said axis.

8. A connector as recited in claim 4, wherein said arms have a radially inner section which contacts said upset portion and extends along a first plane, and a bump extending radially inwardly from said first plane, said bump having a radially inner dimension which is less than the radially outer dimension of said upset portion, such that said bump resists insertion of said upset portion.

9. A connector as recited in claim 8, wherein said bump has an outer ramped portion extending from a radially inner face of said radially inner section at an angle relative to said axis which is greater than an angle of said first plane relative to said axis, said outer ramped portion extending to a generally flat portion, and said outer ramped portion extends at an angle relative to said axis that is greater than the angle at which said flat portion extends relative to said axis.

10. A quick connect tubing connector comprising:
a tube extending along an axis, and having a first outer diameter over the majority of an axial length, and at least outer diameter over the majority of an axial length, and at least one upset portion of a greater outer dimension at one axial location;
a body defining a bore to receive said tube, said bore extending from an outer end axially inwardly; and
a retainer positioned within said bore to retain said tube within said bore, said retainer having a plurality of circumferentially spaced resilient arms, each of said arms having a radially outer section connected to a radially inner section at an arm bend, said radially inner sections extending radially and axially inwardly from said arm bend to abut an axially outer face of said upset portion and retain said tube within said housing, said radially inner sections having a brace extending circumferentially from each circumferential extent of said radially inner sections, said braces extending axially from a brace axially inner end to a brace axially outer end, an outer bend being formed at said brace axially outer end, said brace outer bend extending radially outwardly from said brace, and said brace outer bend being axially aligned with said arm bend, such that said arm bends and said brace outer bends all generally lie in a single plane drawn perpendicular to said axis.

11. A connector as recited in claim 10, wherein said braces extend radially inwardly in a direction moving circumferentially from said circumferential extents of said radially inner sections.

12. A connector as recited in claim 10, wherein said axially inner end of said braces is also bent radially outwardly of said braces.

13. A connector as recited in claim 10, wherein said outer bends and said arm bends abut an inner face of said body.

14. A retainer as recited in claim 1, wherein said radially inner sections include a bump extending radially inwardly from said radially inner section.

15. A retainer as recited in claim 14, wherein said bump has a ramped portion extending radially at a first angle and a flat portion extending axially from said ramped portion at an angle to said axis that is less than said first angle.

16. A retainer as recited in claim 1, wherein a connector ring connects inner axial ends of said radially outer sections of said arms, and in cylindrical ring extends axially inwardly from said connector ring.

17. A retainer as recited in claim 1, wherein said body has four resilient arms.

18. A retainer as recited in claim 1, wherein said radially outer sections and said radially inner sections of said arms are connected at arm bends, said arm bends being generally axially aligned with said first bent axial ends of said braces, such that said arm bends and brace bends are generally located in a single plane perpendicular to said axis.

19. A connector as recited in claim 7, wherein said arm bends and said bends at said axially outer ends of said braces are in substantially planar engagement with an inner face of said body, such that loads resulting from resistance against tube removal are distributed uniformly to said arms and to said braces without deformation of said arms or said braces.

20. A connector as recited in claim 4, wherein said retainer has four resilient arms.

21. A connector as recited in claim 19, wherein said arm and said braces contact said inner face of said seal body at at least 12 circumferentially spaced locations.

22. A connector as recited in claim 4, wherein said bends at said axially outer ends of said braces contact said upset portion.

23. A connector as recited in claim 6, wherein said bends at said axially outer ends of said braces contact said upset portion.

24. A connector as recited in claim 23, wherein said arms and said braces contact said upset portion at at least 12 circumferentially spaced locations.

25. A connector as recited in claim 10, wherein said retainer has four resilient arms.

26. A connector as recited in claim 13, wherein said outer bends and said arm bends are in planar engagement with said inner face of said body, such that loads resulting from resistance against tube removal are distributed uniformly to said arms and to said braces without deformation of said arms or said braces.

27. A connector as recited in claim 13, wherein said arm bends and said outer bends contact said inner face of said body at at least 12 circumferentially spaced locations.

28. A connector as recited in claim 12, wherein said bends at said axially inner ends of said braces abut said axially outer face of said upset portion.

29. A connector as recited in claim 28, wherein said arms and said braces contact said upset portions at at least 12 circumferentially spaced locations.

30. A connector as recited in claim 10, wherein said radially inner sections include a bump extending radially inwardly from said radially inner sections.

31. A connector as recited in claim 30, wherein said lump has a ramped portion extending radially inwardly at a first angle and a flat portion extending axially from said ramped portion at an angle to said axis that is less than said first angle.

32. A connector as recited in claim 10, wherein a connector ring connects inner axial ends of said radially outer sections of said arms, and a cylindrical ring extends axially inwardly from said connector ring.

33. A retainer for retaining a tube within a bore comprising: a body centered on an axis, and having a plurality of resilient arms extending from a ring, each said arm having a radially outer section and a radially inner section, said radially inner sections extending for a first circumferential distance, and a brace extending circumferentially from at least one of the circumferential extents of said radially inner sections, said brace extending axially from a brace axial inner end adjacent said ring to a brace axial outer end remote from said ring, an inner bend being formed at said brace axial inner end.

34. A retainer as recited in claim 33, wherein a brace extends circumferentially from each circumferential extent of said radially inner sections.

35. A retainer as recited in claim 33, wherein said inner bend is bent radially outwardly of said brace.

36. A retainer as recited in claim 33, wherein an outer bend is formed at said brace axially outer end.

37. A retainer as recited in claim 36, wherein said outer bend is bent radially outwardly of said brace.

38. A retainer as recited in claim 33, wherein said radially outer section is connected to said radially inner section of each said arm at an arm bend.

39. A retainer as recited in claim 36, wherein said radially outer section is connected to said radially inner section of each said arm at an arm bend.

40. A retainer as recited in claim 39, wherein said outer bends of said braces are axially aligned with said arm bends, such that said arm bends and said outer bends all generally lie in a single plane drawn perpendicular to said axis.

41. A connector as recited in claim 33, wherein said radially inner sections include a bump extending radially inwardly from said radially inner sections.

42. A connector as recited in claim 41, wherein said bump has a ramped portion extending radially inwardly at a first angle and a flat portion extending axially from said ramped portion at an angle to said axis that is less than said first angle.

43. A connector as recited in claim 33, wherein a connector ring connects inner axial ends of said radially outer sections of said arms, and a cylindrical ring extends axially inwardly from said connector ring.

44. A retainer as recited in claim 33, wherein said body has four resilient arms.

* * * * *